United States Patent

[11] 3,623,450

[72] Inventor Imre Siller
Nurnberg, Germany
[21] Appl. No. 2,192
[22] Filed Jan. 12, 1970
[45] Patented Nov. 30, 1971
[73] Assignee Grundig E. M. V. Elektro-Mechanische Versuchsanstalt, InH.: Max Grundig
Furth Bayern, Germany
[32] Priority Jan. 11, 1969
[33] Germany
[31] G 69 00 933

[54] CASSETTE FOR MAGNETIC TAPE OR THE LIKE
11 Claims, 3 Drawing Figs.

[52] U.S. Cl. .......... 116/133, 274/4 C, 352/78
[51] Int. Cl. .......... G09f 9/00
[50] Field of Search .......... 116/114, 67, 133, 124, 135, 114 J; 95/19; 274/4 C, 4 D, 41.4, 43; 235/71, 79, 87, 103, 115; 352/74–78, 72, 73, 170

[56] References Cited
UNITED STATES PATENTS

| | | | |
|---|---|---|---|
| 2,874,672 | 2/1959 | Hamm, Jr. | 116/133 |
| 2,987,956 | 6/1961 | Planert et al. | 116/114 UX |
| 2,080,086 | 5/1937 | Mihalyi | 352/170 X |
| 2,320,722 | 6/1943 | Frost | 116/114 J |
| 2,714,844 | 8/1955 | Heidecke | 95/11 |
| 2,781,019 | 2/1957 | Tiger | 116/124 |

*Primary Examiner*—Louis J. Capozi
*Attorney*—Michael S. Striker

ABSTRACT: A cassette for convoluted magnetic tape having a flat plastic housing one narrow wall of which is provided with a window located in front of two coaxial indicia bearing wheels which can be adjusted so as to expose a combination of digits or other symbols indicative of the information stored on the tape. The wheels can be rotated independently of each other and are biased apart by a prestressed spring which prevents unintentional changes in the selected combination of observable symbols.

BY

IMRE SILLER

INVENTOR.

CASSETTE FOR MAGNETIC TAPE OR THE LIKE

BACKGROUND OF THE INVENTION

The present invention relates to cassettes or magazines for storage of convoluted band material, particularly for storage of magnetic sound-recording tape or exposed photographic film. Still more particularly, the invention relates to improvements in means for facilitating identification of the information which is stored on magnetic tape or other elongated bandlike carrier of information.

At the present time, information which is stored on magnetic tape in a cassette is normally identified by numerals or letters which are written on paper labels pasted onto the exterior of the housing of a cassette. The housing is provided with a flat external surface for reception of labels on which the data identifying the information stored on the tape are applied with a pencil, pen or the like. A drawback of such cassettes is that the labels are likely to become soiled so that the recorded data are not readily discernible. Furthermore, the corners of labels tend to become loose and it is necessary to erase or to otherwise remove the previously applied data if the tape is to store fresh information. If the data are applied in ink, the user must keep a supply of labels handy so that a freshly inscribed label can be pasted over the previously used label. Also, the user must keep a pencil or a pen at hand close to the cassette or cassettes.

SUMMARY OF THE INVENTION

An object of the invention is to provide a cassette or magazine for storage of convoluted band material with novel means for facilitating rapid and convenient identification of information which is stored on the enclosed band material, particularly on magnetic tape or motion picture film.

Another object of the invention is to provide a cassette wherein the means which serves for identification of information on the band material can be adjusted, either by hand or by resorting to rudimentary tools, so that it can identify a wide variety of recorded information.

A further object of the invention is to provide a cassette for magnetic tape or the like with a simple, compact and easy to manipulate system for identification of recorded information.

An additional object of the invention is to provide a cassette with an identifying system which is properly protected against obliteration of identifying indicia, which occupies little room in or on a cassette, and which contributes little to the initial cost of the cassette.

The invention is embodied in a cassette for convoluted band material, particularly for convoluted magnetic tape. The cassette comprises a housing which is arranged to accommodate a supply of convoluted band material and includes a wall provided with window means, and adjustable means for identifying the band material in the housing (and more particularly the information which is stored on the band material). The adjustable means comprises at least one indicia-bearing member which is journaled in the housing for angular movement between a plurality of positions in each of which at least one of its indicia is observable through the window means, the visible indicium or indicia being indicative of the information which is stored on the band material.

In accordance with a presently preferred embodiment of the invention, the adjustable means comprises two coaxial wheellike members which are rotatable in the housing independently of each other and each of which carries on its periphery a series of digits, letters, symbols or other indicia. A detent structure is preferably provided to yieldably hold the indicia bearing members against unintentional angular displacement from selected positions. These members can be rotated by resorting to a screwdriver, a coin or another rudimentary tool.

The novel features which are considered as characteristic of the invention are set forth in particular in the appended claims. The improved cassette itself, however, both as to its construction and the mode of manipulating the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
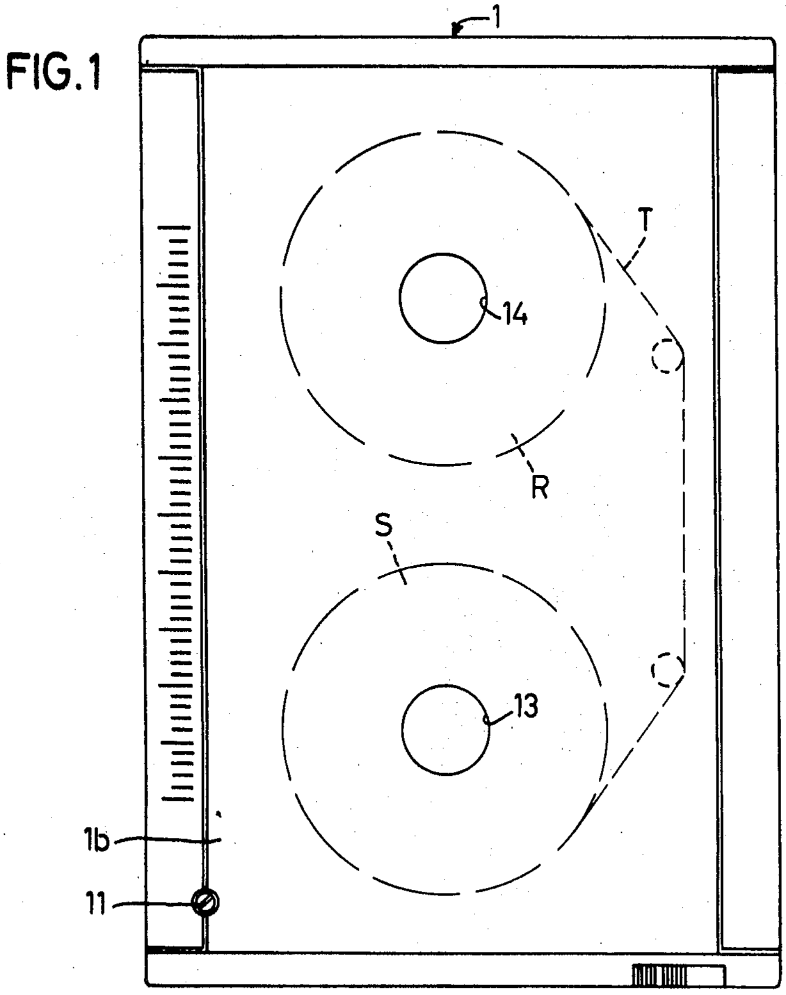
FIG. 1 is a schematic side elevational view of a cassette which embodies the invention.
Figure 2:
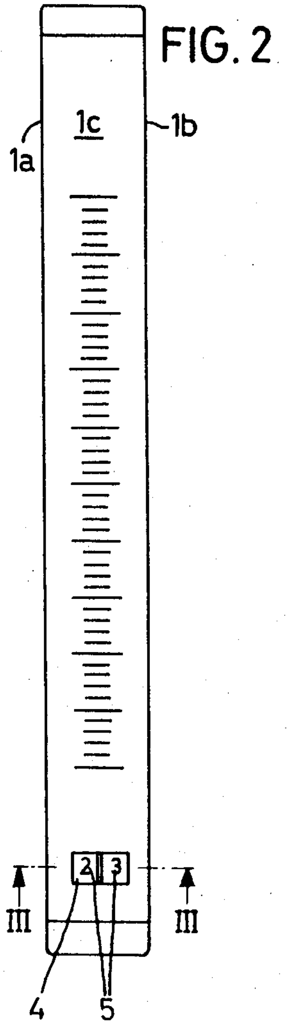
FIG. 2 is an end elevational view of the cassette as seen from the left-hand side of FIG. 1.
Figure 3:
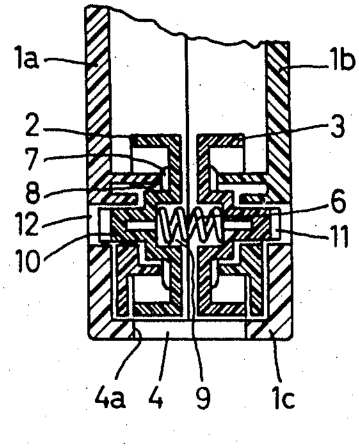
FIG. 3 is an enlarged fragmentary horizontal sectional view as seen in the direction of arrows from the line III—III of FIG. 2.

The cassette or magazine of FIGS. 1 and 2 comprises a housing 1 which preferably consists of synthetic thermoplastic material and comprises two separable preferably mirror symmetrical halves or shells *1a*, *1b* shown in FIG. 3. The internal chamber of the housing 1 accommodates a supply of convoluted band material (e.g., magnetic sound recording tape T) which is stored on a supply reel S and can be collected by a takeup reel R. It is clear that tape T can be stored on a supply reel which is coaxial with the takeup reel. The manner in which the tape is guided between the two reels and certain other conventional details of the cassette form no part of the present invention. If the cassette is used merely as a means for storage of tape T, i.e., not for placing into or onto a tape recorder or the like, it can be stored like a book on a shelf or the like, not shown, so that the narrow elongated rear wall *1c* (best seen in FIG. 2) is observable from in front of the shelf. This narrow wall *1c* is provided at a point close to its lower end with an opening or window *4a* having a transparent or translucent pane 4 which is located in front of two coaxial wheellike indicia bearing members 2, 3 (hereinafter called wheels for short). The peripheral surfaces of these wheels are provided with indicia in the form of digits but it is clear that they may be provided with letters, other types of symbols, or with combination of digits, letters and/or other indicia. For example, the wheel 2 may carry the digits 1–9 and the wheel 3 may carry the digits 0–9 or vice versa. The members 2, 3 may resemble wheels which are used in certain types of film frame counters. FIG. 2 shows that the digits "2" and "3" of the wheels, 2, 3, represent a particular indicium 5, namely, the number "23" which indicates to the observer that the tape T in the housing 1 stores a certain information, for example, a recorded speech, a song or the like.

The cassette further comprises a simple detent structure which insures that the wheels 2, 3 cannot unintentionally change their angular positions, for example, in response to tilting or inversion of the housing 1. The detent structure comprises a prestressed helical spring 6 which is disposed between the wheels, 2, 3 and biases them against the adjacent portions of the respective sheels *1a*, *1b*. In order to facilitate proper indexing of the wheels, the detent structure further comprises a radially extending projection or rib 7 at the outer side of each wheel and a set of radial recesses or grooves 8 provided in the adjacent surface of the respective shell *1a*, *1b*. The hubs 10 of the wheels 2, 3 are journaled in coaxial holes 12 of the shells *1a*, *1b* and such hubs are provided with diametral notches 11 for reception of the working end of a screwdriver, a portion of a coin or another simple tool which enables the manipulator to overcome the bias of the spring 6 and to change the angular position of the respective wheel so that a selected digit is observable behind the window pane 4. The end portions of the spring 6 extend into coaxial recesses 9 provided in the inner sides of the wheels 2 and 3. These wheels may consist of synthetic plastic material and may be of any desired color. The operator can select any number between 0 and "99," and each such number can identify a different information stored on the tape T. In order to facilitate further classification of recorded information, the wheels 2, 3 of different cassettes may be made of differently colored material to respectively denote classical music, folk songs, jazz music, speeches or other types of information.

It is clear that the improved cassette is susceptible of many additional modifications without departing from the spirit of the present invention. For example, the positions or projections 7 and recesses 8 can be reversed, the projections 7 may constitute rounded protuberances, the housing 1 can accommodate a single wheel 2 or 3 which can carry more than ten symbols, and the window can be placed into one of the major walls of the housing 1 or at a different point of the rear wall 1*c*. Moreover, the pane 4 can be omitted since the indicia on the wheels 2, 3 are normally protected from dust and other influences by being fully accommodated in the housing 1. Still further, portions of the wheels 2, 3 can extend from the housing, i.e., beyond the wall 1*c*, so that they can be rotated by hand, and such projecting portions can be knurled, milled or otherwise roughened to facilitate angular displacement. Finally, the tape T in the housing 1 may constitute a length of exposed motion picture film and the indicia on the wheels 2, 3, then serve to identify the scenes or subjects which are portrayed on the exposed film frames. The cassette shown in FIGS. 1 and 2 is assumed to be a so-called working cassette which can be placed onto the deck of a tape recorder whereby the portions of couplings which serve to rotate the reels S, R extend through openings 13, 14 provided in the shell 1*b*. However, and as mentioned above, the cassette may constitute a simple container for storage of convoluted band material on a rack or the like. When the cassette constitutes a container, the chamber which accommodates the band material is preferably sealable against entry of dust or moisture.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A cassette for convoluted band material, particularly for convoluted magnetic tape, comprising a housing arranged to accommodate a supply of convoluted band material, said housing having a wall provided with a window means; and adjustable means for identifying the band material in said housing, comprising at least one indicia-bearing member journaled in said housing behind said window means for angular movement between a plurality of angular positions in each of which at least one of its indicia is observable through said window means, and detent means for releasably retaining said indicia-bearing member in a respectively selected angular position.

2. A cassette as defined in claim 1, wherein said housing consists of synthetic plastic material and comprises a narrow elongated portion constituting said wall thereof.

3. A cassette as defined in claim 1, wherein said window means includes a light-transmitting pane.

4. A cassette as defined in claim 1, and further comprising manipulating means operatively associated with said member and accessible at the exterior of said housing for enabling angular displacement of said member from said exterior.

5. A cassette as defined in claim 1, wherein said detent means comprises yieldable means for yieldably retaining said member in said respectively selected angular position.

6. A cassette as defined in claim 5, wherein said yieldable means comprises spring means for biasing said member against said housing.

7. A cassette as defined in claim 1, wherein said detent means comprises a stationary second member adjacent to said indicia-bearing member, one of said members comprising at least one projection and the other of said members comprising a plurality of recesses one of which receives said projection in each angular position of said indicia-bearing member.

8. A cassette as defined in claim 7, wherein said second member forms part of said housing.

9. A cassette as defined in claim 1, wherein said adjustable means comprises a pair of coaxial wheel-shaped indicia-bearing members having peripheral surfaces provided with said indicia.

10. A cassette as defined in claim 9, wherein said detent means comprises prestressed spring means interposed between said members and arranged to bias each of said members against said housing.

11. A cassette as defined in claim 9, wherein each of said members comprises an axially extending hub which is accessible for manipulation at the exterior of said housing to facilitate angular displacement of the respective member.

* * * * *